March 18, 1958

C. T. HAYES 2,827,581

ELECTROMAGNETIC TORQUE TRANSMITTING APPARATUS

Filed Aug. 15, 1955

INVENTOR
CHARLES T. HAYES
BY
ATTORNEYS

March 18, 1958  C. T. HAYES  2,827,581
ELECTROMAGNETIC TORQUE TRANSMITTING APPARATUS
Filed Aug. 15, 1955  3 Sheets-Sheet 3
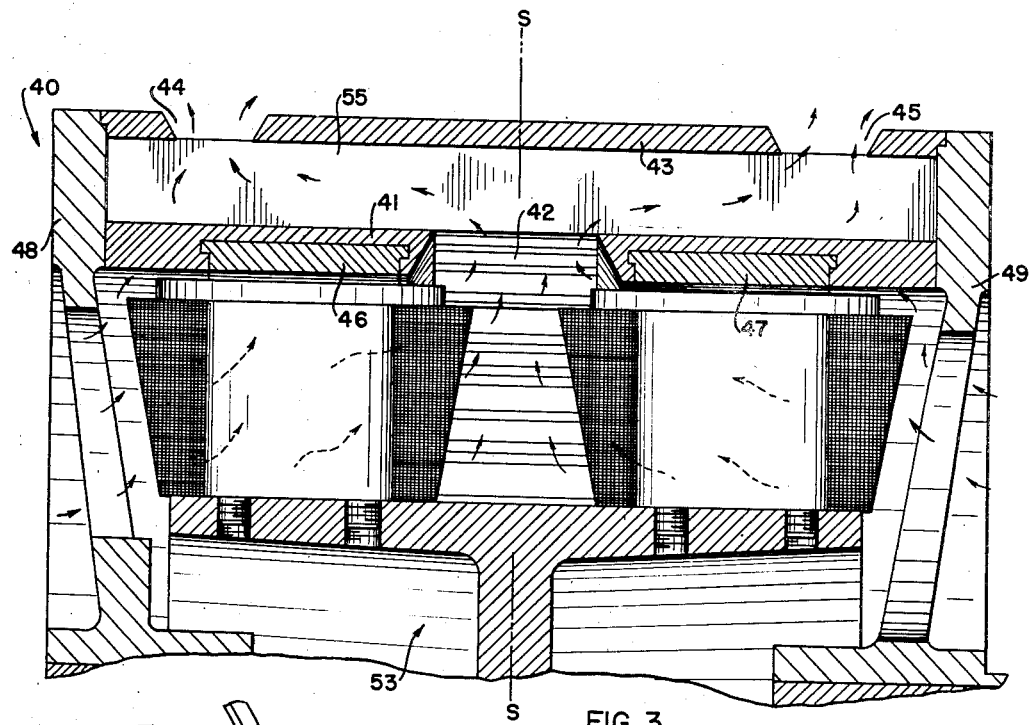
FIG. 3
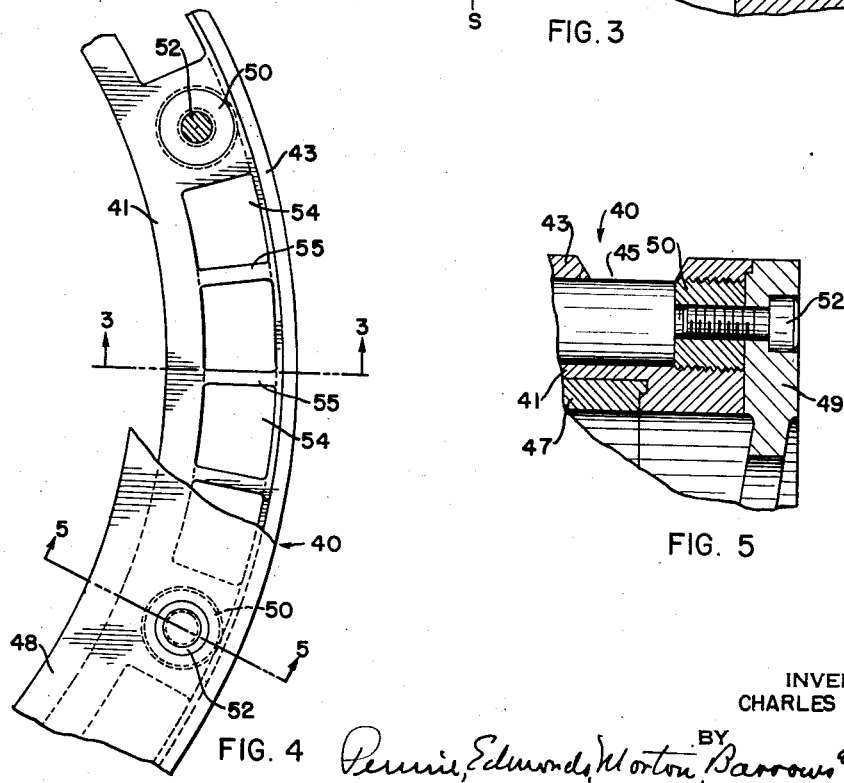
FIG. 4
FIG. 5
INVENTOR
CHARLES T. HAYES
BY
ATTORNEYS United States Patent Office 2,827,581
Patented Mar. 18, 1958

2,827,581

ELECTROMAGNETIC TORQUE TRANSMITTING APPARATUS

Charles T. Hayes, New Rochelle, N. Y.

Application August 15, 1955, Serial No. 528,400

20 Claims. (Cl. 310—105)

This invention relates to electromagnetic torque transmitting apparatus and more particularly to an air cooled eddy current machine which incorporates a symmetrical, bimetallic outer inductor member.

Fundamentally an eddy current machine consists of a magnetic flux generating field member and an inductor member mounted to permit relative motion therebetween. Relative motion between the two members causes the magnetic flux generated by the field member to sweep the inductor member and induce eddy currents therein. Reactive magnetic flux is generated by the eddy currents and couples with the inducing magnetic flux to transmit torque between the two members. Increases in relative motion or "slip speed" induce larger magnitudes of eddy currents and therefore increases in transmitted torque. Since variations in the load driven by either the inductor or field member increase or reduce slip speed, eddy current machines have the characteristic of automatically adjusting transmitted torque to load.

Heat generation in the inductor member by the eddy currents induced therein results in thermal expansion and stress which may seriously impair the operation and efficiency of the eddy current machine. Thermally induced expansion of the inductor member can cause fracture or serious distortion. The possibility of damage is increased by the coincidence of greater thermal and mechanical stress when the machine is handling large loads. Heat generation within the inductor member may also cause unequal relative expansion of the inductor and field members and distortion of the air gap spacing therebetween. It is not uncommon under those circumstances for physical contact to take place between the two members. Additionally, nonconcentricity of air gap spacing results in out-of-center magnetic pull which impairs the efficiency of the machine and results in uneven mechanical stresses on the inductor and field member supports.

It is an object of this invention to provide an air cooled inductor member for an eddy current machine which is self-cooling, and has high heat dissipating capacity and low thermal stress.

It is another object of this invention to provide an inductor member for an eddy current machine which imparts to the machine a steeply rising, variable torque-slip characteristic.

It is also an object of this invention to provide a low cost, easily producible eddy current machine in which there is practically no possibility of thermally or mechanically induced physical contact between inductor and field members or of nonconcentricity of air gap spacing.

To this end the eddy current machine of this invention incorporates an outer inductor member symmetrically constructed with respect to its axis of rotation and a plane perpendicular thereto. The inductor member comprises a cylindrical cooling member whose axis is coincident with the axis of rotation, a pair of rings of magnetic material having inwardly facing exposed surfaces, said rings being embedded in said cooling member, said cooling member being made of material having a high thermal conductivity relative to the material of the rings, and a pair of end members supporting the cooling member, the said cooling member having an aperture between the two rings, and the said end members having apertures therein, said cooling member and end member apertures providing air passages establishing a flow of air therethrough.

In the preferred embodiment of the inductor member, the cooling member comprises inner and outer concentric cylinders joined by means of lengthwise, circumferentially spaced ribs, the inner cylinder having two rings of magnetic material embedded therein, a peripheral centrally positioned aperture between the two rings, and a pair of peripheral bounding apertures positioned to either outer side of the rings, and the outer cylinder having a peripheral centrally positioned aperture.

In the preferred embodiment of the inductor member, the aperture arrangement in the cooling member may be modified, the inner cylinder having a peripheral centrally positioned aperture between the two embedded rings, and the outer cylinder having a pair of peripheral apertures positioned to either side of the perpendicular plane of symmetry and sufficiently removed from said plane to induce airflow over the outer surface of the embedded rings.

Advantageously the cooling member is made of material which, in addition to having a relatively high thermal conductivity, has a low mass density and a high coefficient of expansion relative to the material of the magnetic rings. Aluminum or aluminum alloys have the desired characteristics for cooling member application. The alloys should be composed predominantly of aluminum so as to have the characteristics of aluminum with respect to mass density, thermal conductivity and coefficient of expansion. The rings are made of some magnetic material, preferably low carbon steel or iron.

The eddy current machine of this invention incorporates an inner field member associated with the described outer inductor member, the inductor and field members being mounted to permit relative rotation about a common axis of rotation. Advantageously both the field and inductor members are symmetrically constructed with respect to the said axis of rotation and a plane perpendicular thereto. The field member preferably comprises at least one outwardly directed row of circumferentially spaced salient pole pieces, each having a coil wound therearound.

The invention will now be described in detail in connection with the accompanying drawings, in which:

Fig. 3 is a partial front, cross-sectional view of the eddy current machine of this invention illustrating a modified form of the inductor and field members, the inductor member cross section being taken along line 3—3 of Fig. 4.

Fig. 4 is a partial side view of the cast inductor member illustrated in Fig. 3.

Fig. 5 is a cross section of the end plate fastening arrangement used with the inductor member of Figs. 3 and 4 taken along the line 5—5 of Fig. 4.

Figure 1:
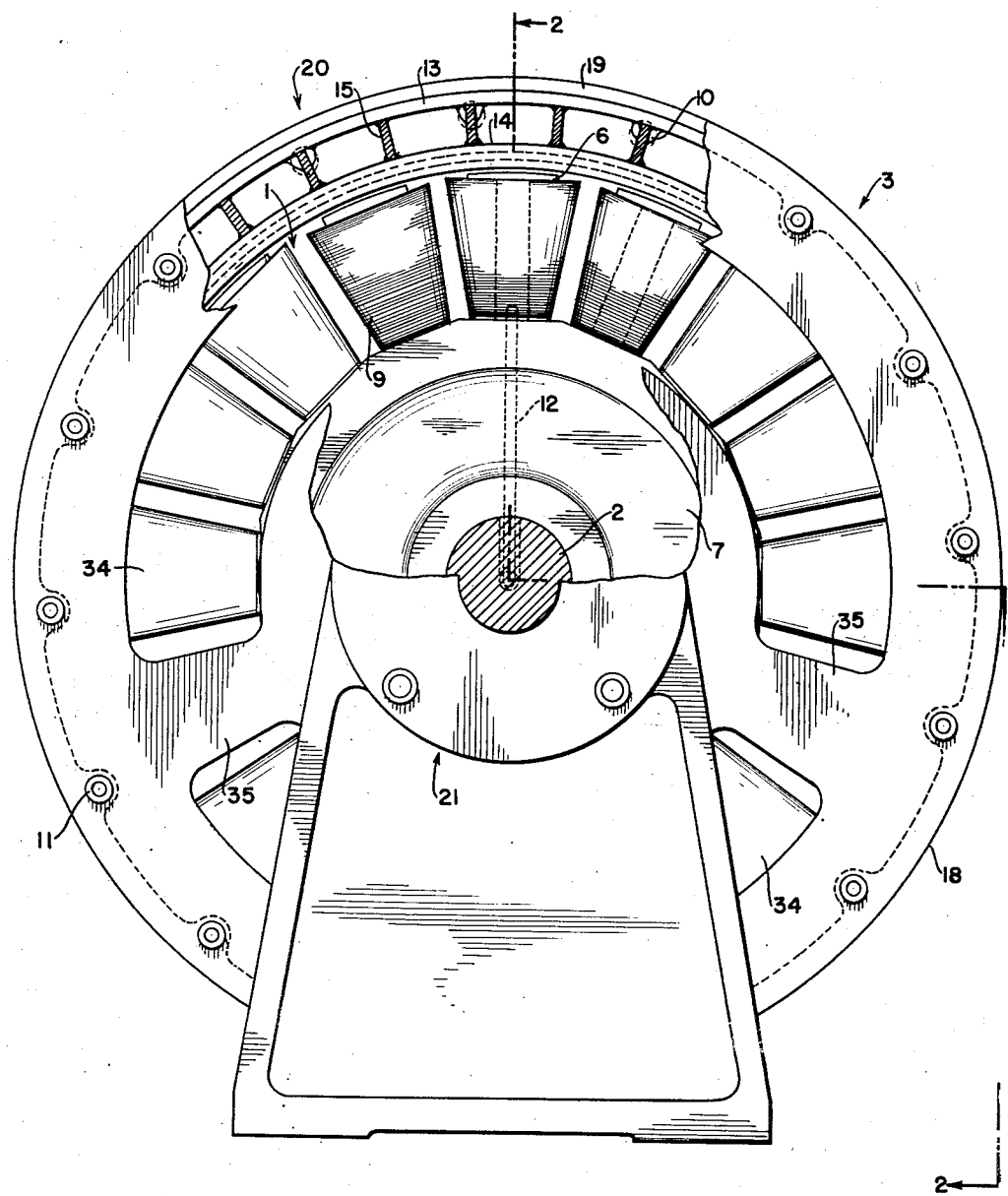
Fig. 1 is a side view of an embodiment of the eddy current machine of this invention partially shown as a cross section taken along line 1—1 of Fig. 2 to illustrate the inductor and field member construction.
Figure 2:
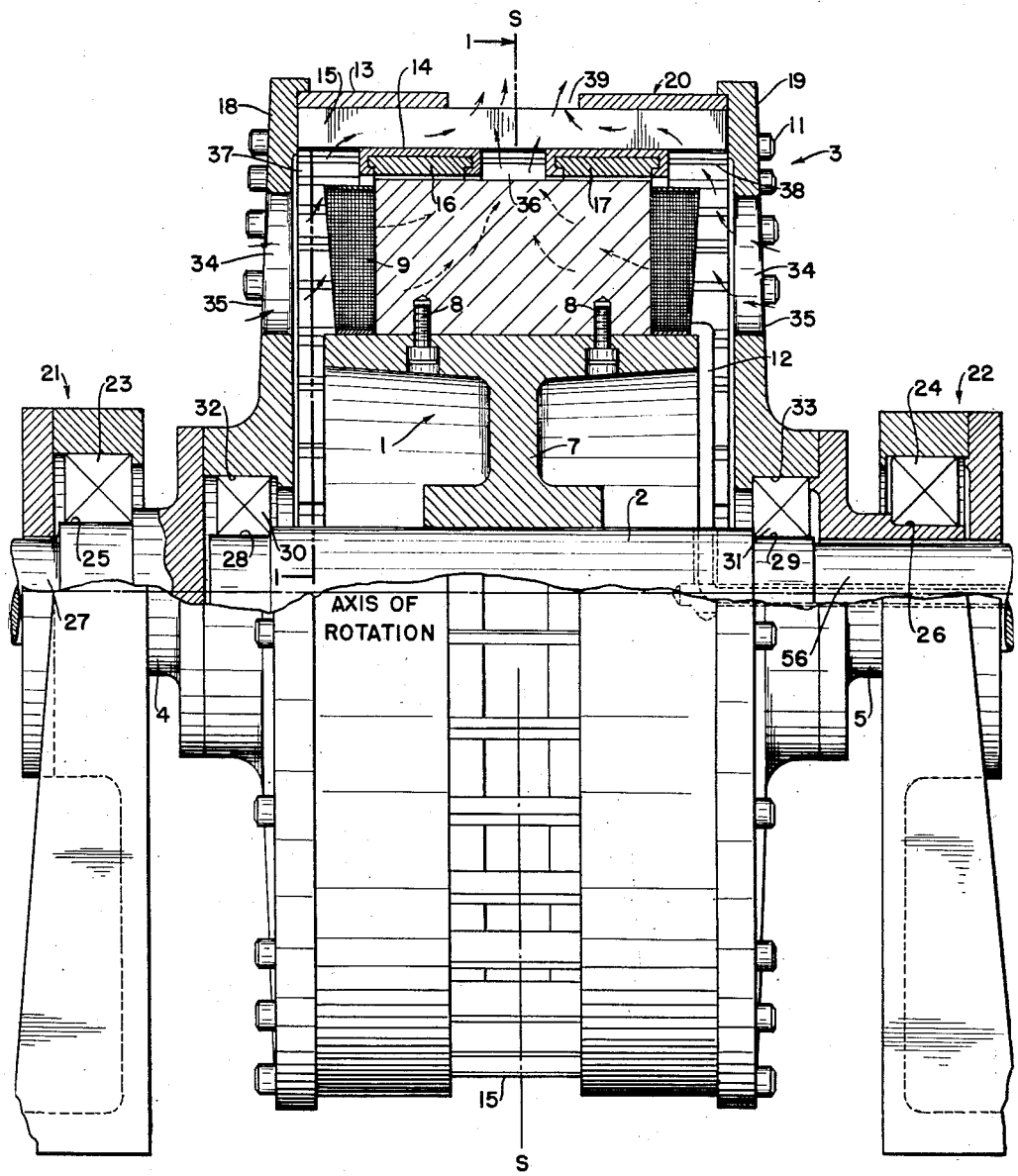
Fig. 2 is a front view of the eddy current machine illustrated in Fig. 1 partially shown as a cross section taken along line 2—2 of Fig. 1 to illustrate the inductor and field member construction and mounting support.

Referring now to Figs. 1 and 2, there is shown an eddy current machine adaptable for use as a clutch or brake. The machine comprises an inner field member 1, mounted on shaft 2, and an outer inductor member 3, mounted on shafts 4 and 5, each member being mounted rotatably about a common axis of rotation.

The field member comprises a circumferentially spaced row of outwardly directed salient pole pieces 6, a hub 7 to which each of the pole pieces is individually mounted by means of bolts 8, and windings in the form of coils 9. Hub 7 is keyed onto shaft 2. Coils 9 are firmly wound, fitted to the salient pole pieces, and impregnated after the pole pieces are bolted to the hub. Current is introduced to the coils by means of conductive leads covered and protected by sheath 12 threaded through an opening in shaft 2. The conductive leads are attached to slip rings which are not shown in the drawings. It will be noted that the field member is constructed so that it is symmetrical both about the axis of rotation and a plane of symmetry S—S perpendicular thereto.

The inductor member 3 includes a cylindrical cooling member 20 whose axis is coincident with the axis of rotation. Cooling member 20 comprises an outer cylinder 13 and an inner cylinder 14 which are concentric and are joined by lengthwise, circumferentially equally spaced ribs 15. Rings 16 and 17 (Fig. 2), made of some magnetic material, preferably low carbon steel or iron, are embedded within inner cylinder 14. The inwardly facing surfaces of rings 16 and 17 are exposed and together with the inner surface of cylinder 14 form a continuous surface which is separated from the outer surfaces of pole pieces 6 by a concentric air gap. End members 18 and 19 are attached to shafts 4 and 5 and support cooling member 20 by means of bolts 11 passing through the end members and screwed into tapped holes in bosses 10. It will be noted that the inductor member comprising cooling member 20, rings 16 and 17, and end members 18 and 19 is symmetrically constructed with respect to both the axis of rotation and plane S—S.

The eddy current machine described can be adapted for use as either a clutch or a brake by mounting both the inductor and field members rotatably, the brake application then merely requiring the rotary restraint of one of the members.

The mounting arrangement illustrated in Fig. 2 permits rotation of both members while retaining to a large degree the symmetry of configuration of the machine. Shafts 4 and 5 each are supported by identical support members 21 and 22 having, respectively, ball bearing inserts 23 and 24. Bearing surfaces 25 and 26 are machined onto shafts 4 and 5 and are spaced equidistant from the perpendicular plane of symmetry S—S. Shaft 4 has an extension 27 for driving purposes while shaft 5 has a bore therein for the passage of extension 56 of shaft 2.

Shaft 2 comprises a cylindric bar machined to form bearing surfaces 28 and 29 and driving extension 23. Bearing surfaces 28 and 29 are spaced equidistant from the plane of symmetry S—S. Ball bearings inserts 30 and 31 support bearing surfaces 28 and 29 relative to bearing surfaces 32 and 33 of end members 18 and 19.

When there is relative motion between field member 1 and inductor member 3, the magnetic flux generated by the coil and pole pieces of the field member sweeps the magnetic rings 16 and 17 and induces eddy currents therein. The eddy current generation (and therefore heat generation) is largely confined to the rings. The cooling member in which the magnetic rings are embedded is designed to conduct the heat from the magnetic rings and dissipate it by air cooling means. Therefore the cooling member is constructed of some material having a high thermal conductivity relative to the material of the magnetic rings, preferably aluminum or an aluminum alloy, so that the heat generated in the rings is rapidly transferred therefrom and distributed throughout the cooling member structure. The thermal conductivity between the magnetic ring and a cooling member made of aluminum or an aluminum alloy may be substantially increased by the use of known bonding processes to bond the embedded rings to the cooling member.

The end members and the cooling member are designed to initiate an airflow pattern which will dissipate the heat distributed throughout the cooling member. Each of the end plates in Figs. 1 and 2 is provided with circumferentially disposed apertures 34 separated by ribs 35. Inner cylinder 14 of the cooling member has an aperture 36 centrally positioned between magnetic rings 16 and 17, and bounding apertures 37 and 38 positioned to either outer side of the magnetic rings. Outer cylinder 13 has a centrally positioned aperture 39. In the embodiment shown, the apertures are continuous and extend peripherally around the cylinders, airflow compartments being formed by means of the lengthwise ribs 15 positioned between cylinders 13 and 14. The airflow pattern established by this air passage arrangement is indicated by arrows in Fig. 2 and is inspired by the fan action of the cooling member with its radial ribs and air passages, augmented to some extent by the rotation of the salient poles and attached coils of the field member. If further cooling is required, fan blade extensions may be attached to the radial ribs of the cooling member and allowed to project outwards through the aperture in the outer cylinder. The compartmentalized cooling member offers a large superficial area to the airflow with resultant high heat dissipation throughout. In addition, the design of the cooling member permits changing the division of the airflow pattern to suit a desired application by varying the areas of the apertures.

It will be noted that the positions of the airflow apertures maintain the symmetry of the inductor member construction and induce airflow pattern symmetry. The combination of airflow pattern symmetry and construction symmetry results in symmetrical heat distribution and cooling of the inductor member with respect to the axis and plane of symmetry. Such construction practically eliminates the possibility of variation in the concentricity of the air gap caused by distortion of the inductor member. Thus the problem of physical contact, and out-of-center magnetic pull between members is effectively eliminated.

Thermal stresses within the inductor member are also minimized by means of the symmetrical cooling and construction arrangement. The introduction of thermal stress to the inductor member because of its bimetallic construction is minimized by the use of a material for the cooling member which has a higher coefficient of expansion than the material of the magnetic ring. A cooling member made of aluminum or an aluminum alloy, and magnetic rings made of some ferrous material have such relative coefficients of expansion. The magnetic rings operate at a higher temperature than the cooling member but the relative coefficients of expansion largely cancel out any differences in expansion between the two materials, thereby minimizing thermal stress.

The bimetallic construction of the inductor member also permits minimization of its moment of inertia since the cooling member may be made of a material having a much lower mass density than the material of the magnetic rings. Again aluminum or an aluminum alloy has the desired property for such an application.

As has been described hereinbefore, the torque transmitted by the inductor and field members increases with the slip speed between the members. It is desirable in many cases that the torque-slip characteristic of the eddy current machine should rise steeply so that large torques may be obtained at low slip speeds. The described bimetallic construction of the inductor member permits adjustment of the torque-slip characteristic of the machine. The inner cylinder 14 extends around the sides and outer surface of the magnetic rings 16 and 17 thereby functioning in much the same manner as a deep squirrel cage. Such arrangement increases the available torque over the lower part of the slip speed range. In addition, the exact shape of the torque-slip characteristic curve can be varied to suit individual requirements by changing the electrical resistance of the critical surrounding portions of the cooling cylinder. Changes in electrical resistance can be effected quite readily by cutting the critical surrounding portions into sections or by varying the cross section or chemical analysis thereof.

Another advantage of the described form of inductor member construction is that the cooling surfaces are very largely self-cleaning and do not tend to become clogged if the machine is used in a dirty or dusty atmosphere. In the event that dust or dirt should eventually accumulate on the cooling surfaces, the construction permits easy cleaning by simple mechanical means.

The position of the inductor member outside the field member makes possible the hereinbefore described design of a self-cooling inductor member which acts as a centrifugal fan and has a large cooling surface for the dissipation of heat. Advantageously when the eddy current machine is used as a clutch or a brake, the outer inductor member is made the driver so that it will rotate at higher speed than the field member thereby insuring constant and effective cooling.

The use of an outer inductor member also permits very small air gap spacing between the inductor and field members, with a consequent increase in torque transmission therebetween. As has been already mentioned, the bulk of the generated heat is concentrated within the inductor member and increases with increasing load. Therefore, as the load increases, the air gap increases due to the difference in expansion of the inner field member and the outer inductor member thus permitting the initial design of a very small air gap and a consequent increase in the starting torque transmission. The bearing arrangement illustrated in Fig. 2 enables the field and inductor members to be mounted in accurate concentric relationship thereby further minimizing the air gap spacing.

The field member also rises in temperature during the operation of the eddy current machine due to losses in the coil winding and the pole pieces, and heat pickup from the surrounding inductor member. However, with the construction shown, the field member always operates at a temperature substantially lower than that of the inductor member. The relative expansion of the members is aided in the direction of increased air gap separation with increased load since the cooling incoming air passes through the inlet apertures in the end members and flows over the pole pieces before reaching the hotter cooling member and magnetic rings, as indicated by the airflow pattern in Fig. 2. The coils are also exposed to the action of the airflow since they are wound around the pole pieces.

Thermal effects are not as critical in the field member as they are in the inductor member and therefore symmetrical construction and cooling is not as imperative. However, that portion of the field member that is in the path of the airflow affects the symmetry of the airflow pattern passing through the cooling member. For this reason, that portion, in this case the salient pole pieces and coils, is preferably symmetrically constructed with respect to the axis of rotation and plane S—S. Advantageously the entire field member is symmetrically constructed to insure the maximum in avoidance of undesirable thermal effects.

Fig. 3 illustrates modifications in the design of both the field and inductor members. The modified members illustrated may be used together as shown in Fig. 3 or may be used in combination with the members illustrated in Figs. 1 and 2.

Inductor member 40 differs from inductor member 3 of Figs. 1 and 2 in that the cooling member has a different arrangement of the apertures in the inner and outer cooling cylinders. Inner cylinder 41 has a centrally positioned aperture 42 while outer cylinder 43 has two apertures 44 and 45 positioned to either side of the perpendicular plane of symmetry S—S far enough from said plane of symmetry to induce airflow over the outer surface of inner cylinder 41 covering the outer surfaces of embedded magnetic rings 46 and 47, said airflow being indicated by arrows.

For best heat transfer the cooling member of this invention should be cast as one piece, the magnetic rings being cast therein by the use of known bonding processes. Advantageously the lengthwise air passages in the cooling member are formed by cores during the casting process and the peripheral apertures are machined thereafter.

Figs. 4 and 5 illustrate the cast cooling member of Fig. 3 attached to its supporting end members by means alternative to those previously described. The cooling member is cast in such a manner that certain of the cored cooling passages 54 are circular instead of rectangular, these circular passages being equally spaced between the others. Each end of each circular passage is then plugged, preferably with aluminum or aluminum alloy plugs 50 screwed into its position before the casting is machined. These plugs are then tapped out to receive the fixing bolts 52.

Field member 53 illustrated in Fig. 3 differs from field member 1 in Figs. 1 and 2 in that two axially spaced rows of outwardly directed salient pole pieces are used instead of one. Each of the rows is associated with a single embedded magnetic ring, thereby providing more effective utilization of the magnetic flux generated by the coil and pole piece combinations. The symmetry of the field member with respect to the axis of rotation and plane S—S is retained in this two-row arrangement.

The field members are not limited to the constructions described hereinbefore as the inductor member construction permits the use of various winding arrangements including, as examples, a distributed wound field or a twin homopolar field.

Preferred embodiments of the invention have been described. Various changes and modifications, however, may be made within the scope of the invention as set forth in the appended claims. For example, the inductor member need not be limited to two embedded magnetic rings. Ganged arrangement of the inductor members described may be used if desired. Additionally, the field member may be designed to have a number of rows of salient pole pieces corresponding to the number of embedded rings.

Where the term "symmetry" has been used hereinbefore and is used in the appended claims, it is intended to include within its meaning, in addition to true symmetry, slight departures from true symmetry which do not materially affect the symmetrical cooling and symmetrical construction of this invention.

I claim:

1. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis is coincident with said axis of rotation, a pair of rings of magnetic material having inwardly facing exposed surfaces, said rings being embedded in the cooling member, said cooling member being made of material having a high thermal conductivity relative to the material of the rings, and a pair of end members supporting the cooling member, said cooling member having an aperture between the two rings, and said end members having apertures therein, said cooling member and end member apertures providing air passages establishing a flow of air therethrough and over the said field member.

2. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis is coincident with said axis of rotation, a pair of rings of magnetic material having inwardly facing exposed surfaces, said rings being embedded in the cooling member, said cooling member being made of material having a high thermal conductivity relative to the material of the rings, and a pair of end members supporting the cooling member, said cooling member having an aperture between the two rings, and said end members having apertures therein, said cooling member and end member apertures providing passages establishing a flow of air therethrough and over the said field member, that portion of the field member in the path of the said airflow being symmetrical about the said axis of rotation and perpendicular plane of symmetry.

3. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis is coincident with said axis of rotation, a pair of rings of magnetic material having inwardly facing exposed surfaces, said rings being embedded in the cooling member, said cooling member being made of material having a high thermal conductivity relative to the material of the rings, and a pair of end members supporting the cooling member, said cooling member having an aperture between the two rings, and said end members having apertures therein, said cooling member and end member apertures providing air passages establishing a flow of air therethrough and over the said field member, said inner field member being symmetrical about the said axis of rotation and perpendicular plane of symmetry.

4. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis is coincident with said axis of rotation, a pair of rings of magnetic material having inwardly facing exposed surfaces, said rings being embedded in the cooling member, said cooling member being made of material having a high thermal conductivity relative to the material of the rings, and a pair of end members supporting the cooling member, said cooling member having an aperture between the two rings, and said end members having apertures therein, said cooling member and end member apertures providing air passages establishing a flow of air therethrough and over the said field member, said inner field member comprising an outwardly directed, circumferentially spaced row of salient pole pieces, and windings associated with said pole pieces, said pole pieces forming a symmetrical pattern about the said axis of rotation and perpendicular plane of symmetry.

5. An eddy current machine in accordance with claim 4 in which each pole piece of the field member has a coil wound therearound.

6. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis is coincident with said axis of rotation, a pair of rings of magnetic material having inwardly facing exposed surfaces, said rings being embedded in the cooling member, said cooling member being made of material having a high thermal conductivity relative to the material of the rings, and a pair of end members supporting the cooling member, said cooling member having an aperture between the two rings, and said end members having apertures therein, said cooling member and end member apertures providing air passages establishing a flow of air therethrough and over the said field member, said inner field member comprising a pair of outwardly directed, axially spaced rows of circumferentially spaced salient pole pieces, and windings associated with said pole pieces, each of said rows being associated with one of said magnetic rings, said rows forming a symmetrical pattern about the said axis of rotation and perpendicular plane of symmetry.

7. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis is coincident with said axis of rotation, said cooling member comprising inner and outer concentric cylinders, and lengthwise, circumferentially spaced ribs joining the inner and outer cylinders, a pair of rings of magnetic material having inwardly facing exposed surfaces, said rings being embedded in the inner cylinder of the said cooling member, said inner and outer cylinders and ribs being made of material having a high thermal conductivity relative to the material of the rings, and a pair of end members supporting the cooling member, the inner cylinder of the said cooling member having a peripheral centrally positioned aperture between the two rings, and a pair of peripheral bounding apertures positioned to either outer side of the rings, the outer cylinder of the cooling member having a peripheral centrally positioned aperture, and said end members having apertures therein, said cooling member and end member apertures providing air passages establishing a flow of air therethrough and over the said field member, that portion of said field member in the path of the said airflow being symmetrical about the said axis of rotation and perpendicular plane of symmetry.

8. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis coincides with said axis of rotation, said cooling member comprising inner and outer concentric cylinders, and lengthwise, circumferentially spaced ribs joining the inner and outer cylinders, a pair of rings of magnetic material having inwardly facing exposed surfaces, said rings being embedded in the inner cylinder of the cooling member, said inner and outer cylinders and ribs being made of material having a high thermal conductivity relative to the material of the rings, and a pair of end members supporting the cooling member, the inner cylinder of the cooling member having a peripheral centrally positioned aperture between the two rings, the outer cylinder of the cooling member having a pair of peripheral apertures positioned to either side of the perpendicular plane of symmetry and sufficiently removed from said plane to induce airflow over the outer surfaces of the embedded rings, and the end members having apertures therein, said cooling member and end member apertures providing air passages establishing a flow of air therethrough and over the said field member, that portion of said field member in the path of the said airflow being symmetrical about the said axis of rotation and perpendicular plane of symmetry.

9. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis is coincident with said axis of rotation, said cooling member comprising inner and outer concentric cylinders, and lengthwise, circumferentially spaced ribs joining the inner and outer cylinders, a pair of rings of magnetic material having inwardly facing exposed surfaces said rings being embedded in the inner cylinder of the said cooling member, said inner and outer cylinders and ribs being made of material having a high thermal conductivity relative to the material of the rings, and a pair of end members supporting the cooling member, the inner cylinder of the said cooling member having a peripheral centrally positioned aperture between the two rings, and a pair of peripheral bounding apertures positioned to either outer side of the rings, the outer cylinder of the cooling member having a peripheral centrally positioned aperture, and said end members having apertures therein, said cooling member and end member apertures providing air passages establishing a flow of air therethrough and over the said field member, said inner field member comprising an outwardly directed, circumferentially spaced row of salient pole pieces, and windings associated with said pole pieces, said pole pieces forming a symmetrical pattern about the said axis of rotation and perpendicular plane of symmetry.

10. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis is coincident with said axis of rotation, said cooling member comprising inner and outer concentric cylinders, and lengthwise, circumferentially spaced ribs joining the inner and outer cylinders, a pair of rings of magnetic material having inwardly facing exposed surfaces, said rings being imbedded in the inner cylinder of the said cooling member, said inner and outer cylinders and ribs being made of material having a high thermal conductivity relative to the material of the rings, and a pair of end members supporting the cooling member, the inner cylinder of the said cooling member having a peripheral centrally positioned aperture between the two rings, and a pair of peripheral bounding apertures positioned to either outer side of the rings, the outer cylinder of the cooling member having a peripheral centrally positioned aperture, and said end members having apertures therein, said cooling member and end member apertures providing air passages establishing a flow of air therethrough and over the said field member, said inner field member comprising a pair of outwardly directed, axially spaced rows of circumferentially spaced salient pole pieces, and windings associated with said pole pieces, each of said rows being associated with one of said magnetic rings, said rows forming a symmetrical pattern about the said axis of rotation and perpendicular plane of symmetry.

11. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis coincides with said axis of rotation, said cooling member comprising inner and outer concentric cylinders, and lengthwise, circumcumferentially spaced ribs joining the inner and outer cylinders, a pair of rings of magnetic material having inwardly facing exposed surfaces, said rings being embedded in the inner cylinder of the cooling member, said inner and outer cylinders and ribs being made of material having a high thermal conductivity relative to the material of the rings, and a pair of end members supporting the cooling member, the inner cylinder of the cooling member having a peripheral centrally positioned aperture between the two rings, the outer cylinder of the cooling member having a pair of peripheral apertures positioned to either side of the perpendicular plane of symmetry and sufficiently removed from said plane to induce airflow over the outer surfaces of the embedded rings, and the end members having apertures therein, said cooling member and end member apertures providing air passages establishing a flow of air therethrough and over the said field member, said inner field member comprising an outwardly directed, circumferentially spaced row of salient pole pieces, and windings associated with said pole pieces, said pole pieces forming a symmetrical pattern about the said axis of rotation and perpendicular plane of symmetry.

12. An eddy current machine comprising an inner field member and an outer inductor member mounted to permit relative rotation about an axis of rotation, said outer inductor member being symmetrical about the axis of rotation and a plane perpendicular thereto and comprising a cylindrical cooling member whose axis coincides with said axis of rotation, said cooling member comprising inner and outer concentric cylinders, and lengthwise, circumferentially spaced ribs joining the inner and outer cylinders, a pair of rings of magnetic material having inwardly facing exposed surfaces, said rings being embedded in the inner cylinder of the cooling member, said inner and outer cylinders and ribs being made of material having a high thermal conductivity relative to the material of the rings, and a pair of end members supporting the cooling member, the inner cylinder of the cooling member having a peripheral centrally positioned aperture between the two rings, the outer cylinder of the cooling member having a pair of peripheral apertures positioned to either side of the perpendicular plane of symmetry and sufficiently removed from said plane to induce airflow over the outer surfaces of the embedded rings, and the end members having apertures therein, said cooling member and end member apertures providing air passages establishing a flow of air therethrough and over the said field member, said inner field member comprising a pair of outwardly directed, axially spaced rows of circumferentially spaced salient pole pieces, and windings associated with said pole pieces, each of said rows being associated with one of said magnetic rings, said rows forming a symmetrical pattern about the said axis of rotation and perpendicular plane of symmetry.

13. An outer inductor member which is symmetrical about its axis of rotation and a plane perpendicular thereto adapted for use in an air cooled eddy current machine, comprising a cylindrical cooling member whose axis is coincident with said axis of rotation, a pair of rings of magnetic material having inwardly facing exposed surfaces, said rings being embedded in the cooling member, said cooling member being made of material having a high thermal conductivity relative to the material of the rings, and a pair of end members supporting the cooling member, the said cooling member having an aperture providing an air passage between the two rings, and said end members having apertures therein, said cooling member and end member apertures providing air passages establishing a flow of air therethrough.

14. An outer inductor member in accordance with claim 13 in which the material of the cooling member has a high coefficient of expansion relative to the material of the rings.

15. An outer inductor member in accordance with claim 13 in which the material of the cooling member has a low mass density and a high coefficient of expansion relative to the material of the rings.

16. An outer inductor member in accordance with claim 13 in which the material of the cooling member is, at least predominantly, aluminum.

17. An outer inductor member which is symmetrical about its axis of rotation and a plane perpendicular thereto adapted for use in an air cooled eddy current machine, comprising a cylindrical cooling member whose axis is coincident with said axis of rotation, said cooling member comprising inner and outer concentric cylinders, and lengthwise, circumferentially spaced ribs joining the inner and outer cylinders, a pair of rings of magnetic material having inwardly facing exposed surfaces, said rings being embedded in the inner cylinder of the said cooling member, said inner and outer cylinders and ribs being made of material having a high thermal conductivity relative to the material of the rings, and a pair of end members supporting the cooling member, the inner cylinder of the said cooling member having a peripheral centrally positioned aperture between the two rings, and a pair of peripheral bounding apertures positioned to either outer side of the rings, the outer cylinder of the cooling member having a peripheral centrally positioned aperture, and said end members having apertures therein, said cooling member and end member apertures providing air passages establishing a flow of air therethrough.

18. An outer inductor member in accordance with claim 17 in which the inner and outer cylinders and ribs comprising the cooling member are made, at least predominantly, of aluminum.

19. An outer inductor member which is symmetrical about its axis of rotation and a plane of symmetry perpendicular thereto adapted for use in an air cooled eddy current machine, comprising a cylindrical cooling member whose axis coincides with said axis of rotation, said cooling member comprising inner and outer concentric cylinders, and lengthwise, circumferentially spaced ribs joining the inner and outer cylinders, a pair of rings of magnetic material having inwardly facing exposed surfaces, said rings being embedded in the inner cylinder of the cooling member, said inner and outer cylinders and ribs being made of material having a high thermal conductivity relative to the material of the rings, and a pair of end members supporting the cooling member, the inner cylinder of the cooling member having a peripheral centrally positioned aperture between the two rings, the outer cylinder of the cooling member having a pair of peripheral apertures positioned to either side of the perpendicular plane of symmetry and sufficiently removed from said plane to induce air flow over the outer surfaces of the embedded rings, and the end members having apertures therein, said cooling member and end member apertures providing air passages establishing a flow of air therethrough.

20. An outer inductor member in accordance with claim 19 in which the inner and outer cylinders and ribs comprising the cooling member are made, at least predominantly, of aluminum.

References Cited in the file of this patent
UNITED STATES PATENTS

| | | |
|---|---|---|
| 2,393,211 | Winther | Jan. 15, 1946 |
| 2,484,138 | Winther | Oct. 11, 1949 |